United States Patent
Shirata

[11] Patent Number: 5,870,623
[45] Date of Patent: Feb. 9, 1999

[54] I/O PORT FOR DETERMINING ACCIDENTS IN AN EXTERNAL DEVICE

[75] Inventor: Shuichi Shirata, Hyogo, Japan

[73] Assignees: Mitsubishi Denki Kabushiki Kaisha, Tokyo; Mitsubishi Electric Semiconductor Software Corporation, Itami, both of Japan

[21] Appl. No.: 798,118

[22] Filed: Feb. 12, 1997

[30] Foreign Application Priority Data

Sep. 3, 1996 [JP] Japan .................................. 8-233366

[51] Int. Cl.⁶ .................................................. G06K 11/00
[52] U.S. Cl. .............................. 395/800.38; 395/182.07; 395/183.2; 395/185.09; 395/733
[58] Field of Search .................. 395/800.38, 182.07, 395/183.2, 185.04, 733

[56] References Cited

U.S. PATENT DOCUMENTS 5,483,635  1/1996  Kameyama ................ 395/182.12
5,534,801  7/1996  Wu et al. ....................... 327/72

FOREIGN PATENT DOCUMENTS 44 21 083  4/1996  Germany.

*Primary Examiner*—Larry D. Donaghue
*Assistant Examiner*—John Follansbee
*Attorney, Agent, or Firm*—Burns, Doane, Swecker & Mathis, LLP

[57] ABSTRACT

A port logical level detection circuit ((81)) detects whether a voltage level of a port (15a) is high or low with respect to a plurality of threshold values. A comparison circuit (82) compares a plurality of detected results with data (S22) held by a port latch (40), and outputs a plurality of comparison results. An accident determination signal generating circuit (83) generates an accident determination signal (S56) from the plurality of comparison results outputted from the comparison circuit (82). Thus, it is possible to determine such an accident that the voltage of the port is at a prescribed logical level of an external circuit (16) or at a level in an indefinite area between prescribed logical levels.

6 Claims, 13 Drawing Sheets

F I G. 2
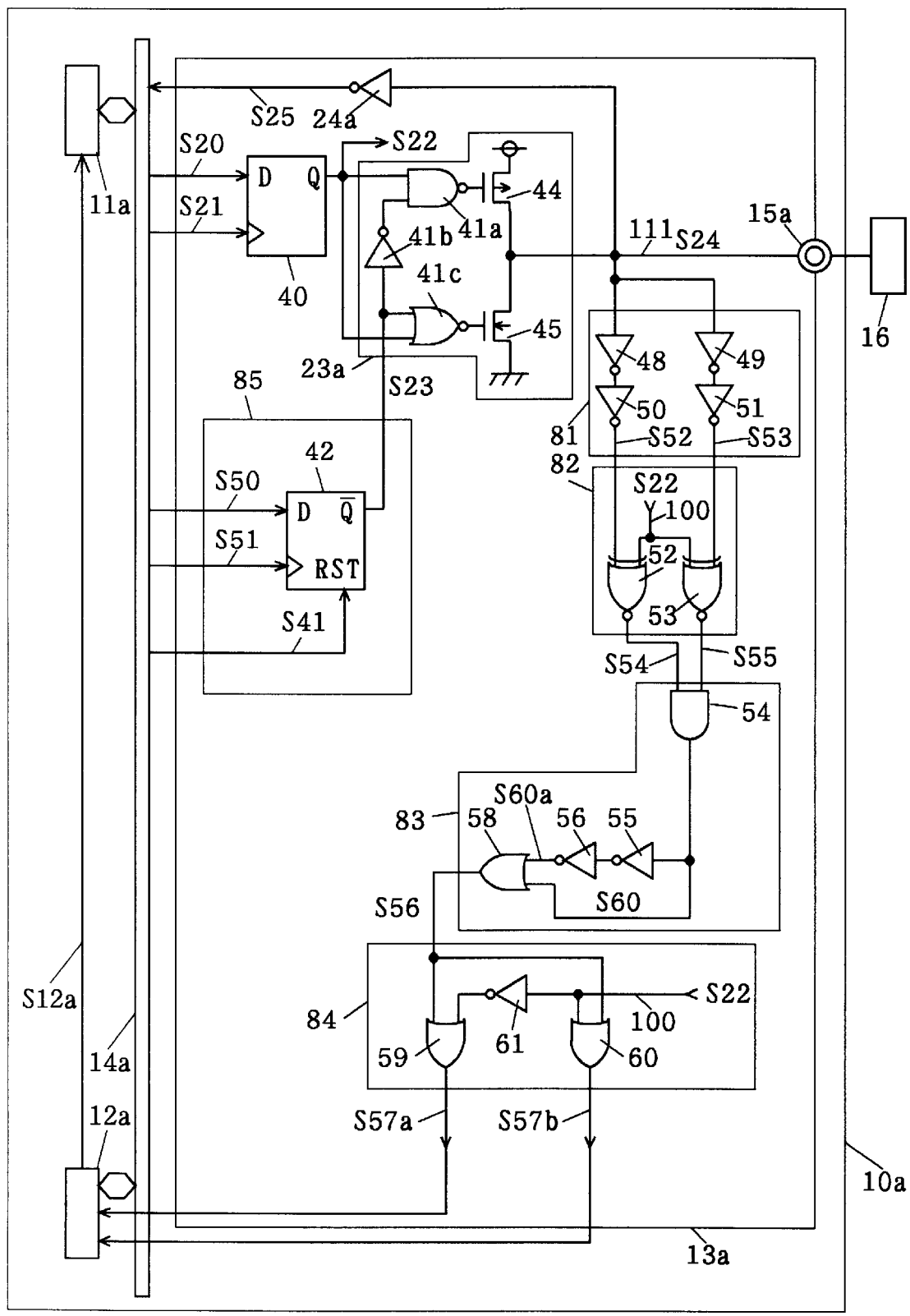

FIG. 3A  RESET SIGNAL S41 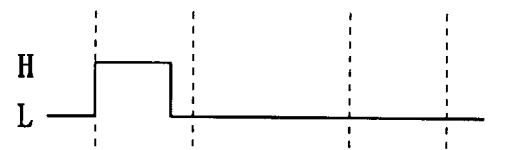
FIG. 3B  OUTPUT BUFFER CONTROL SIGNAL S23 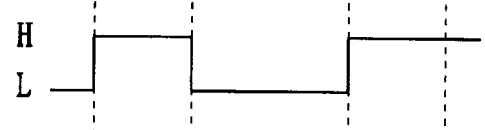
FIG. 3C  S50 
FIG. 3D  S51 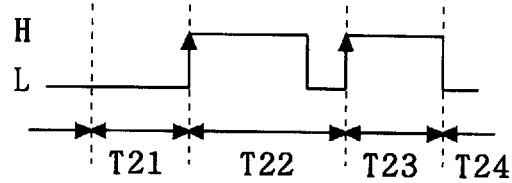

FIG. 4A DATA S22 HELD BY PORT LATCH
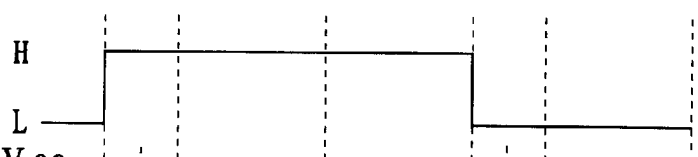
FIG. 4B PORT VOLTAGE (S24)
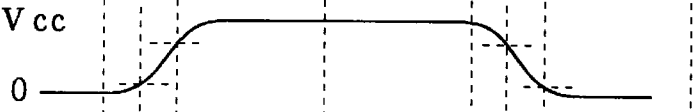
FIG. 4C S52
FIG. 4D S53
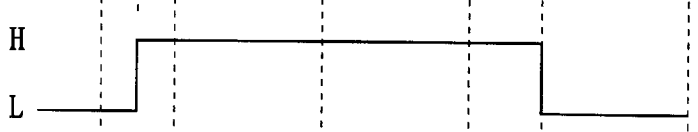
FIG. 4E S54
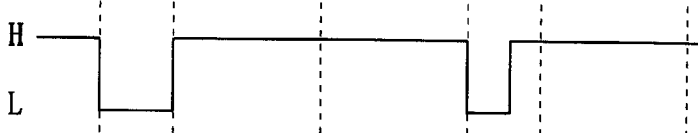
FIG. 4F S55
FIG. 4G S60
FIG. 4H S60a
FIG. 4I ACCIDENT DETERMINATION SIGNAL S56
FIG. 4J OUTPUT BUFFER CONTROL SIGNAL S23
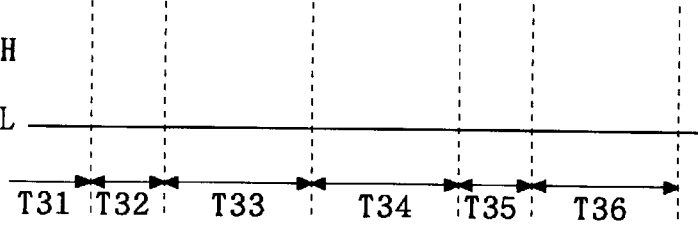

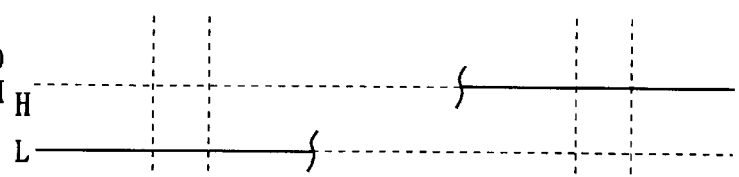
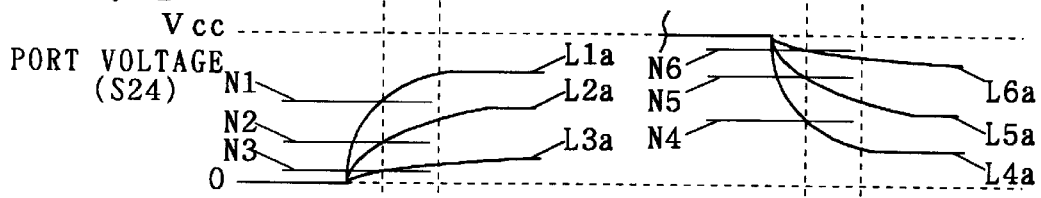
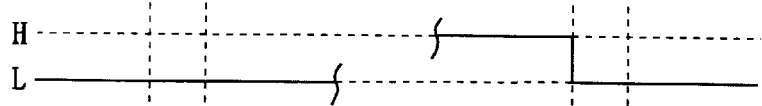
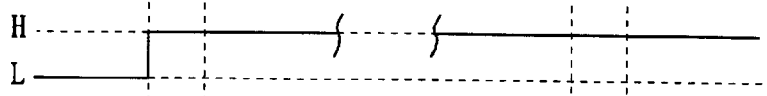
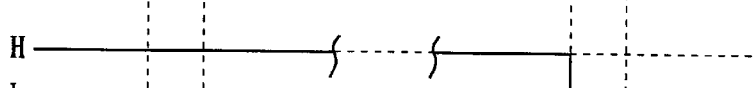
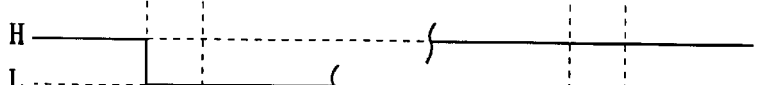
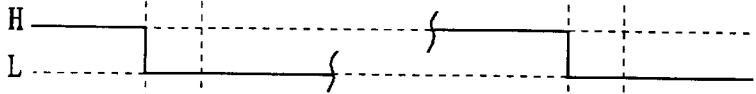
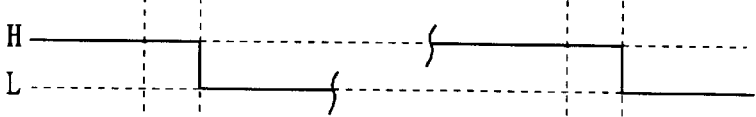
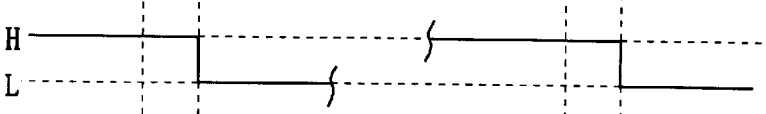
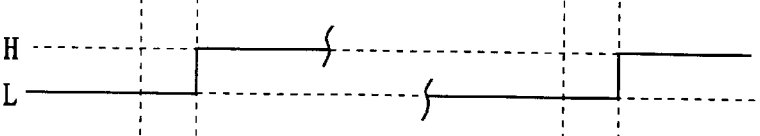
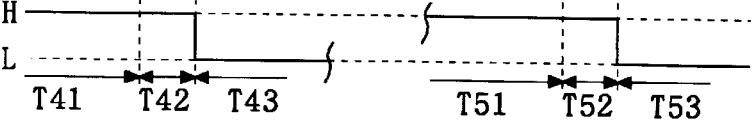

FIG. 9A S41
FIG. 9B S61
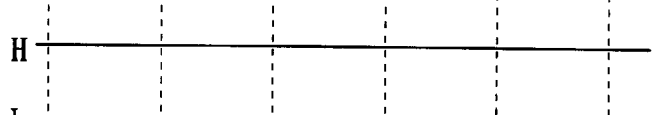
FIG. 9C S60
FIG. 9D S50
FIG. 9E S51
FIG. 9F OUTPUT BUFFER CONTROL SIGNAL S23
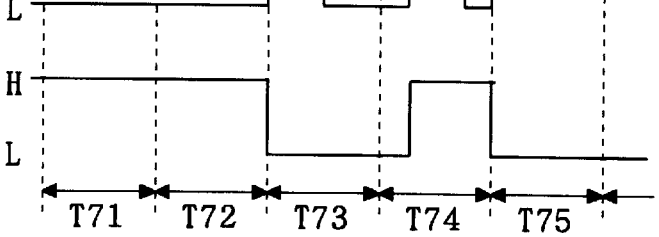

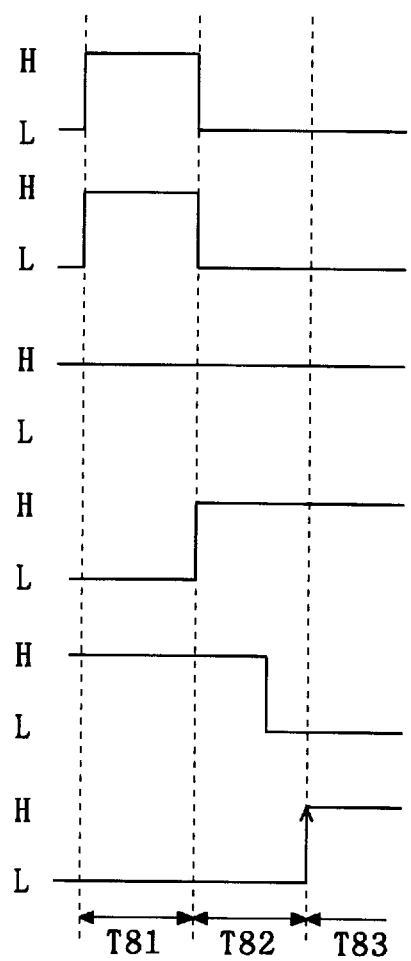
FIG. 10A ACCIDENT DETERMINATION SIGNAL S56
FIG. 10B S61
FIG. 10C S60
FIG. 10D OUTPUT BUFFER CONTROL SIGNAL S23
FIG. 10E S50
FIG. 10F S51

I/O PORT FOR DETERMINING ACCIDENTS IN AN EXTERNAL DEVICE

BACKGROUND OF THE INVENTION

1. Field of the Invention

The present invention relates to a microcomputer capable of determining an accident of an I/O port or an external circuit for the microcomputer which is connected with the I/O port, and protecting the I/O port.

2. Description of the Background Art

FIG. 11 is a block diagram showing the structure of a conventional microcomputer described in Japanese Patent Laying-Open Gazette No. 6-12292 (1994), for example. The microcomputer 10 includes a central processing unit (hereinafter referred to as a CPU) 11, an interrupt control circuit 12, an I/O port 13, an address/data bus 14, and a port 15.

The CPU 11 is adapted to execute an instruction supplied from an external circuit (not shown) for the microcomputer 10, or a memory (not shown) stored therein. The interrupt control circuit 12 outputs an interrupt processing request signal S12 to the CPU 11 when a signal S3 is received from the I/O port 13 while the CPU 11 executes a job, thereby authorizing interruption of another processing instruction. The I/O port 13 inputs/outputs a signal between the CPU 11 and the external circuit for the microcomputer 10. The address/data bus 14 is a line which connects the CPU 11, the I/O port 13 and the like with each other for transferring addresses and data. The port 15 is a terminal of the I/O port 13 which is connected with the external circuit for inputting/outputting a signal S4 between the I/O port 13 and the external circuit.

FIG. 12 is a block diagram showing the structure of the conventional I/O port 13. A port latch 21 is supplied with a write clock signal $\phi_{pw}$ from the address/data bus 14. The port latch 21 holds data S5 transferred through the address/data bus 14 in response to the clock signal $\phi_{pw}$. Data S6 held by the port latch 21 is supplied to an input terminal of an output buffer 23 through a signal line 100. An output terminal of the output buffer 23 is connected with the port 15 by a signal line 101, so that the output buffer 23 serves as an element for outputting the data S6 held by the port latch 21 from the port 15 as a signal S4. An input terminal of an input buffer 24 is also connected to the output terminal of the output buffer 23 by the signal line 100, so that the input buffer 24 serves as an element for incorporating data S4 inputted from the external circuit through the port 15 in the microcomputer 10. A read-in buffer 25 is an element for supplying a signal S7 outputted from the input buffer 24 to the circuits present in the interior of the microcomputer 10 excluding the I/O port 13. An output terminal of the read-in buffer 25 is connected to the address/data bus 14. An exclusive OR circuit (hereinafter referred to as an EX-OR gate) 26 is adapted to compare the data S6 held by the port latch 21 with the signal S7 outputted from the input buffer 24. Therefore, an input terminal of the EX-OR gate 26 is connected to the signal line 100, while another input terminal thereof is connected to the output terminal of the input buffer 24 through a signal line 102. An output terminal of the EX-OR gate 26 is connected to a latch 22 through a signal line 103. The latch 22 is supplied with a write clock signal $\phi$ from the address/data bus 14. The latch 22 temporarily holds an output signal S8 of the EX-OR gate 26 in synchronization with rise of the clock signal $\phi$.

FIG. 13A–FIG. 13G are timing charts showing operation timings of the respective parts in the conventional microcomputer 10 shown in FIG. 12. The operation of the I/O port 13 shown in FIG. 12 is now described with reference to FIG. 13A–FIG. 13G. FIG. 13A–FIG. 13G show signals $\phi$, $\phi_{pw}$, S6, S4, S5, S7, S3, respectively.

An operation in case of writing logical data "0" in the port latch 21 as the data S5 is first described (hereinafter logical data is expressed in "0" or "1").

When the external circuit is normal, the port latch 21 outputs "0", which is the data S6 held therein, to the output buffer 23 and the EX-OR gate 26 at a period T1, as shown in FIG. 13C. Thus, the output buffer 23 outputs "0" to the port 15 as the signal S4.

On the other hand, the EX-OR gate 26 outputs "0" as the signal S8, while the signal S3 outputted from the latch 22 becomes "0" as shown in FIG. 13G.

An operation performed when the external circuit short-circuits with a power supply line and the logical level of the port 15 changes to "1" to differ from the data S6 held by the port latch 21, for example, is now described. In this case, the value of the signal S8 outputted from the EX-OR gate 26 becomes "1", and the signal S3 outputted from the latch 22 becomes "1" in a period T2, as shown in FIG. 13G. This means that some accident takes place in the port 15.

When such an accident takes place, "1" is inputted in the interrupt control circuit 12 by the signal S3 outputted from the latch 22. The interrupt control circuit 12 outputs the interrupt processing request signal S12 to the CPU 11. Due to the supply of the interrupt processing request signal S12, the CPU 12 recognizes the occurrence of the accident in the port 15 of the I/O port 13, and starts prescribed interrupt processing.

An operation in case of writing the data S5 of "1" in the port latch 21 can also be explained similarly to the case where the data S5 written in the port latch 21 is "0".

When the external circuit is normal, the port latch 21 outputs "1" to the output buffer 23 and the EX-OR gate 26 as the held data S6 in a period T3, as shown in FIG. 13C. Since "0" is inputted in the input terminal of the output buffer 23, the output buffer 23 outputs "1" to the port 15 and the EX-OR gate 26 as the signal S4, as shown in FIG. 13D. The values of both input terminals of the EX-OR gate 26 become "1" together, whereby the EX-OR gate 26 outputs "0" as the signal S8, so that the value of the output signal S3 from the latch 22 becomes "0".

When the external circuit short-circuits with an earthing wire and the value of the signal S4 at the port 15 changes to "1", for example, the value of the signal S8 outputted from the EX-OR gate 26 becomes "1", and the value of the signal S3 outputted from the latch 22 becomes "1" in a period T4, as shown in FIG. 13G.

FIG. 14 is a circuit diagram showing another mode of the structure of a conventional I/O port 13. In the structure of the I/O port 13 shown in FIG. 14, an invertor 27 and an AND gate 28 are further added to the I/O port 13 shown in FIG. 12. Namely, the I/O port 13 shown in FIG. 14 is so structured that a clock signal $\phi_{pw}$ is inputted in one input terminal of the AND gate 28 and an output signal S3 of a latch 22 is inverted by the invertor 27 and inputted in another input terminal of the AND gate 28.

When an accident takes place in an external circuit (not shown) which is connected to the port 15 and the value of the signal S3 outputted from the latch 22 is "1", the invertor 27 and the AND gate 28 inhibit further writing in a port latch 21.

Due to such write inhibit processing for the port latch 21, it is possible to prevent the port latch 21 from data rewriting and disappearance of the result of detection of the accident on the port 15 in the period when a CPU 11 is notified of the accident detection and recognizes the occurrence of the accident for performing self processing.

FIG. 15 is a graph showing the relations between voltages and logical levels of the port 15. With reference to FIG. 15, the mode of the port 15 upon occurrence of a short-circuit accident in the external circuit for the microcomputer is described. Referring to FIG. 15, the axis of abscissas shows times, and the axis of ordinates shows voltages.

When the external circuit connected to the port 15 is formed by only CMOS elements and its source voltage is expressed as Vcc, the logical levels are set at "0", "1" and undetermined when the voltages of the port 15 are 0 V to 0.2 Vcc, 0.8 Vcc to Vcc and 0.2 Vcc to 0.8 Vcc respectively, for example. Referring to FIG. 15, numerals 200 and 201 denote the ranges where the external circuit is at the logical levels of "1" and "0" respectively.

When the external circuit is formed by only bipolar elements, on the other hand, the logical levels are at "0", "1" and undetermined when the voltages of the port 15 are 0 V to 0.16 Vcc, 0.5 Vcc to Vcc and 0.16 Vcc to 0.5 Vcc respectively, for example. Referring to FIG. 15, numerals 202 and 203 denote the ranges of the logical levels of "1" and "0" respectively.

Assuming that a short-circuit accident takes place between an external circuit which is formed by only CMOS elements and a power supply line and the voltage level of the port 15 belongs to the logical level of "0" in the initial stage of the occurrence of the accident, for example, the voltage of the port 15 is increased toward the source voltage Vcc with time through various paths as shown by curves L1 to L3 in FIG. 15, since short-circuit resistance varies with the degree of the short-circuit accident.

Assuming that only one input buffer 24 serving as a logical level detector having a logical threshold value of 0.5 Vcc in a circuit for detecting the logical level of the port 15, the short-circuit accident cannot be confirmed when the voltage of the port 15 stays at a level of about 0.3 Vcc to 0.4 Vcc in the region as in the example shown by the curve L2 or L3, for example, since the voltage level of the port 15 is not in excess of 0.5 Vcc, which is the logical threshold value of the logical level detector.

Similarly, when the voltage of the port 15 belongs to the logical level of "1" in the initial stage of occurrence of an accident while the port 15 short-circuits with an earthing wire in the external circuit and the voltage of the port 15 is reduced to and stays at about 0.6 Vcc as in an example shown by a curve L6, the short-circuit accident cannot be confirmed.

In the I/O port 13 shown in FIG. 14, the invertor 27 and the AND gate 28 are added so that an interrupt signal S3 is generated toward the CPU 11 when an accident is found in the port 15 while writing from the CPU 11 to the port latch 21 is simultaneously inhibited, thereby preventing confirmation of the occurrence of the accident from disappearance.

According to this method, however, a high current flows from the port 15 to the external circuit causing the short-circuit accident in a time up to accident processing to break transistors of the output buffer 23, since output of the output buffer 23 is not inhibited.

On the other hand, there has been such a demand that the output buffer 23 is not erroneously connected to the external circuit when a short-circuit accident takes place in case where runaway of the microcomputer 10 is derived by an accident.

SUMMARY OF THE INVENTION

According to a first aspect of the present invention, a microcomputer has a central processing unit, an I/O port for inputting/outputting data in/from an external circuit which is present in the exterior of the microcomputer, and an interrupt control circuit for performing interrupt control on the central processing unit on the basis of an accident notice signal which is formed in the I/O port, and the I/O port includes a connecting terminal with the external circuit, a port logical level detection circuit for comparing a plurality of threshold values between voltage levels providing logical levels of the external circuit with a voltage level of the connecting terminal for outputting logical levels which are decided by the plurality of threshold values as detection results, a port latch for holding data to be outputted to the connecting terminal, an output buffer for outputting the data held by the port latch to the connecting terminal, a comparison circuit for comparing the data held by the port latch with a plurality of detection results of the port logical level detection circuit thereby outputting a plurality of comparison results, and an accident determination signal forming circuit for generating an accident determination signal for reporting presence/absence of an accident on the basis of the plurality of comparison results of the comparison circuit corresponding to the plurality of threshold values, while the I/O port outputs the accident notice signal for performing interrupt control on the central processing unit on the basis of the accident determination signal upon occurrence of an accident mismatching the voltage level of the connecting terminal with the data held by the port latch.

According to a second aspect of the present invention, the microcomputer further includes an output buffer control circuit for inhibiting output of the output buffer on the basis of the accident determination signal.

According to a third aspect of the present invention, the output buffer control circuit includes an output inhibit register for holding set data of output authorization/unauthorization for the output buffer based on the accident determination signal.

The microcomputer according to the first aspect of the present invention includes the port logical level detection circuit which can detect the voltage level of the connecting terminal with a plurality of threshold values, whereby it is possible to determine such an accident that the voltage of the connecting terminal is at a prescribed logical level or at a level in an indefinite region between prescribed logical levels.

The microcomputer according to the second aspect of the present invention is provided with the output buffer control circuit for setting output inhibition of the output buffer on the basis of the accident determination signal, whereby the output buffer can be immediately protected simultaneously with detection of an accident of the external circuit without waiting for accident processing of the CPU.

The microcomputer according to the third aspect of the present invention is provided with the output inhibit register for holding the set data of output authorization/unauthorization for the output buffer based on the accident determination signal, whereby it is possible to protect the data held by the port register against destruction even if the microcomputer runs away.

Accordingly, an object of the present invention is to obtain a microcomputer which can determine an accident also when a voltage of a port is at a prescribed level or at a level in an indefinite region between prescribed logical levels.

Another object of the present invention is to obtain a microcomputer which can immediately protect an output buffer upon detection of an accident without waiting for accident processing of a CPU.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a circuit diagram showing the structure of an I/O port according to the embodiment 1;

FIG. 3A–FIG. 3D are timing charts showing the operation of a direction register shown in FIG. 2;

FIG. 4A–FIG. 4J are timing charts showing operations of respective parts of the I/O port shown in FIG. 2;

FIG. 5A–FIG. 5K are timing charts showing operations of respective parts of the I/O port shown in FIG. 2;

FIG. 9A–FIG. 9F are timing charts showing operations of respective parts of the I/O port shown in FIG. 8;

FIG. 10A–FIG. 10F are timing charts showing operations of respective parts of the I/O port shown in FIG. 8;

DESCRIPTION OF THE PREFERRED EMBODIMENTS

Embodiment 1

Figure 1:
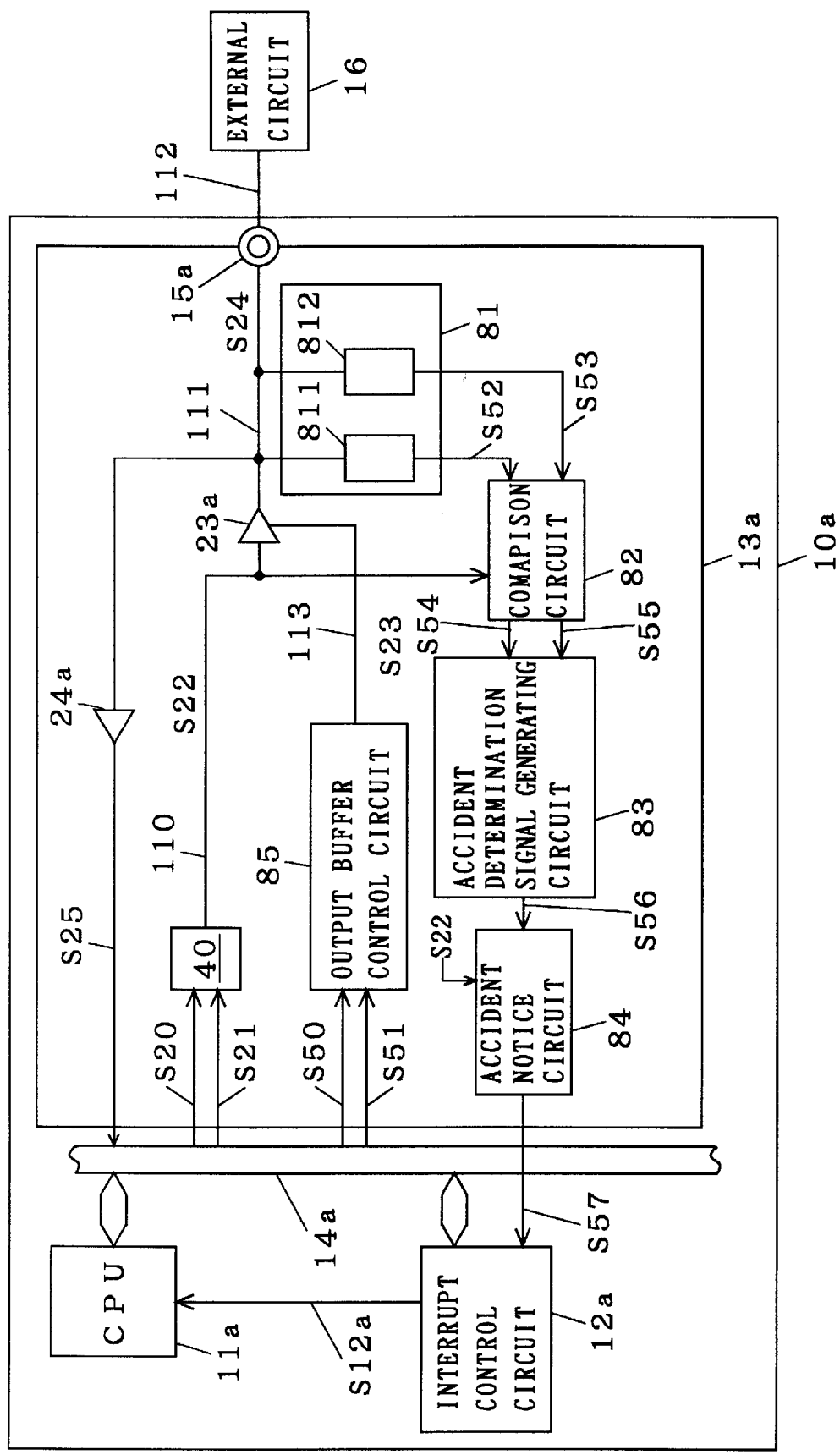
FIG. 1 is a block diagram showing the structure of a microcomputer according to an embodiment 1 of the present invention.

FIG. 1 is a block diagram showing the structure of a microcomputer according to an embodiment 1 of the present invention. Referring to FIG. 1, reference character 10a denotes a microcomputer which is formed on a single chip, character 11a denotes a CPU of the microcomputer 10a, character 12a denotes an interrupt control circuit for interrupting processing of the CPU 11a, character 13a denotes an I/O port for inputting/outputting data between the microcomputer 10a and an external circuit 16, and character 14a denotes an address/data bus serving as a path for data transfer between the CPU 11a and the I/O port 13a etc. The interrupt control circuit 12a generates an interrupt request signal S12a to the CPU 11a on the basis of an interrupt signal S57 outputted from the I/O port 13a.

The I/O port 13a includes a port 15a which is a connecting terminal with the external circuit 16, a port latch 40 for holding data S22 to be outputted to the port 15a, an output buffer 23a for outputting the data S22 held by the port latch 40 to the port 15a, an output buffer control circuit 85 for generating and holding an output buffer control signal S23 for controlling output authorization/unauthorization for the output buffer 23a and setting an input/output direction of the I/O port 13a, an input buffer 24a for incorporating a signal S24 from the external circuit 16, a port logical level detection circuit 81 having a plurality of threshold values for detecting the voltage level of the port 15a, a comparison circuit 82 for comparing the data S22 held by the port latch 40 with a plurality of signals S52 and S53 corresponding to the plurality of threshold values, an accident determination signal generating circuit 83 for generating a single accident determination signal S56 from a plurality of comparison data S54 and S55 from the comparison circuit 82, and an accident notice circuit 84 for generating an accident notice signal S57 for notifying the CPU 11a of occurrence of an accident on the basis of the accident determination signal S56 and the data S22 held by the port latch 40.

The plurality of threshold values provided in the port logical level detection circuit 81 are at voltage levels between prescribed logical levels "1" and "0" of the external circuit 16. In order to set such threshold values, the port logical level detection circuit 81 is formed by connecting a plurality of logical level detectors having different threshold values in parallel with each other. For example, the port logical level detection circuit 81 is formed by a first logical level detector 811 having a first threshold value and a second logical level detector 812 having a second threshold value which is different from the first threshold value. The first and second logical level detectors 811 and 812 determine whether the voltage level of a signal line 111 is higher or lower than the first and second threshold values respectively. Logical values "1" and "0" are rendered to correspond to higher and lower levels respectively.

An output terminal of the port latch 40 is connected to an input terminal of the output buffer 23a and the comparison circuit 82 by a signal line 110. An output terminal of the output buffer 23a is connected to the port 15a and the port logical level detection circuit 81 by the signal line 111. This signal line 111 also connects input terminals of the port 15a and the input buffer 24a with each other. The external circuit 16 is connected to the port 15a by a signal line 112. A signal S25 outputted from the input buffer 24a is supplied to an internal circuit, such as the CPU 11a, for example, of the microcomputer 10a. Signals S20 and S21 supplied to the port latch 40 and signals S50 and S51 supplied to the output buffer control circuit 85 are generated from the CPU 11a and supplied through the address/data bus 14a, for example.

The operation of the microcomputer 10a according to the embodiment 1 is now described with reference to FIG. 1. The output data S20 of the microcomputer 10a to the external circuit 16 is inputted in the port latch 40 from the address/data bus 14a, and held in synchronization with the clock signal S21.

When the microcomputer 10a outputs the signal S24 to the external circuit 16, the output buffer 23a is authorized by the output buffer control signal S23 to output the signal S24 to the port 15a. Thus, the data S22 held by the port latch 40 is outputted to the port 15a through the output buffer 23a.

When data is inputted from the external circuit 16 in the microcomputer 10a, the output buffer control signal S23 inhibits the output buffer 23a from outputting. The port 15a is supplied with the data from the external circuit 16 through the signal line 112. The microcomputer 10a incorporates the signal S24 of the port 15a from the input buffer 24a through the address/data bus 14a. The output buffer control signal S23 is generated and outputted from the output buffer control circuit 85 which is controlled by the signals S50 and S51.

The port logical level detection circuit 81 is formed to be capable of detecting the logical level of the port 15a in a plurality of threshold values between input logical levels, i.e., the prescribed logical levels "1" and "0", of the external circuit 16. When the threshold values are set at the lower limit value of the logical level "1" and the upper limit value of the logical level "0", it is possible to cope with every such abnormality that the voltage level of the port 15a remains in the range of an indefinite region upon occurrence of an accident. The port logical level detection circuit 81 outputs results detected by the first and second logical level detectors 811 and 812 as the signals S52 and S53 respectively.

When the logical level of the port 15a completely changes to "1" by an accident resulting from short-circuiting across the external circuit 16a and a power supply line while the microcomputer 10a outputs "0" to the external circuit 16, or the logical level of the port 15a completely changes to "0" by an accident resulting from short-circuiting across the external circuit 16 and an earthing wire while the microcomputer 10a outputs "1" to the external circuit 16, it is possible to detect the accident similarly to the prior art.

Further, it is possible to detect an accident also when the logical level of the port 15a is indefinite between the prescribed logical levels "1" and "0".

The comparison circuit 82 compares the data S22 held by the port latch 40 with the output signals S52 and S53 of the port logical level detection circuit 81. When the data S22 held by the port latch 40 is different from the logical level of the port 15a indicated by the output signals S52 and S53, occurrence of an accident is determined.

Then, the accident determination signal generating circuit 83 generates the single accident determination signal S56 by the plurality of detection signals S54 and S55 from the comparison circuit 82 corresponding to the detectors for the plurality of threshold values. Namely, each of the plurality of detection signals S54 and S55 has a meaning only when the data S22 held by the port latch 40 is either "1" or "0", and hence the single accident determination signal S56 must be generated by extracting necessary information responsive to each case from the signal S54 or S55.

The accident notice circuit 84 generates an interrupt signal corresponding to a short-circuiting accident across the external circuit 16 and the power supply line or the earthing wire while the port 15a outputs "0" or "1" to the external circuit 16 on the basis of the accident determination signal S56 and the data S22 held by the aport latch 40, for notifying the CPU 11a of the occurrence of the accident.

FIG. 2 is a circuit diagram showing the structure of the I/O port 13a according to the embodiment 1 shown in the block diagram of FIG. 1.

The output buffer 23a, which is a tri-state buffer, enters an output enabled state when the output buffer control signal S23 is "0", while entering an output inhibited state when the signal S23 is "1". An invertor 41b for inverting the output buffer control signal S23, a NAND gate 41a for computing the NAND of an output of the invertor 41b and the data S22, and a NOR gate 41c for computing the NOR of the output buffer control signal S23 and the data S22 are tri-state control circuits. PMOS and NMOS transistors 44 and 45, which are supplied with outputs of the NAND gate 41a and the NOR gate 41c in gates thereof respectively and serially connected across the power supply line and the earthing wire, are output transistors for outputting the signal S24.

Numeral 42 denotes a direction register generating the output buffer control circuit 85. The direction register 42 is adapted to generate the output buffer control signal S23 for controlling output authorization/unauthorization for the output buffer 23 and setting an input/output direction of the I/O port 13a.

The port logical level detection circuit 81 has different threshold values which are voltage levels between the prescribed logical levels "1" and "0" in CMOS or bipolar elements generating the external circuit 16 which is connected in parallel with the port 15a, such as threshold values of 0.2 Vcc and 0.8 Vcc, for example.

Both of input terminals of invertors 48 and 49 having different threshold values for detecting two logical levels are connected to the signal line 111 for transmitting the signal S24. Output terminals of the invertors 48 and 49 are connected to input terminals of general invertors 50 and 51 having threshold values of 0.5 Vcc, for example. Namely, a first logical level detector consisting of the invertors 48 and 50 and a second logical level detector consisting of the invertors 49 and 51 are connected in parallel with each other.

When the external circuit 16 is formed by only CMOS elements, the invertor 48 is set at a high threshold value of 0.8 Vcc, for example, and the invertor 49 is set at a low threshold voltage of 0.2 Vcc, for example.

The comparison circuit 82 is formed by an exclusive NOR (hereinafter referred to as EX-NOR) gate 52 for computing the exclusive NOR of the signals S52 and S22, and an EX-NOR gate 53 for computing the exclusive NOR of the signals S53 and S22.

The accident determination signal generating circuit 83 is formed by an AND gate 54 for computing the AND of the plurality of output signals S54 and S55 of the comparison circuit 82 corresponding to the plurality of threshold values, investors 55 and 56 which are serially connected to an output terminal of the AND gate 54 for delaying its output, and an OR gate 58 for computing the OR of an output signal of the invertor 56 which is that of the series body and the AND gate 54.

The accident notice circuit 84 is adapted to generate an earthing wire short-circuit interrupt signal S57a or a power supply short-circuit interrupt signal S57b as the interrupt signal S57 in response to the logical level of the data S22 held by the port latch 40.

The action of the circuit of this structure is now described. FIG. 3A–FIG. 3D are timing charts showing an operation of the direction register 42 shown in FIG. 2 for initializing the output buffer 23a. When "1" is inputted in a reset terminal of the direction register 42 which is a D flip-flop in a period T21 as shown in FIG. 3A, the output buffer control signals S23 becomes "1" as shown in FIG. 3B and the output buffer 23a is initialized in an output inhibited state.

Then, "0" is inputted in a data terminal of the direction register 42 as shown in FIG. 3C, and "1" is inputted in a control terminal as the signal S51 as shown in FIG. 3D in a period T22, whereby the output buffer control signal S23 becomes "0" and the output buffer 23a is initialized in an output enabled state.

Further, "1" is inputted in the data terminal of the direction register 42 as the signal S50 as shown in FIG. 3C and "1" is inputted in the control terminal as the signal S51 as shown in FIG. 3D in a period T23, whereby the output buffer control signal S23 becomes "1" and the output buffer 23a is initialized in an output inhibited state. In this state, signal input from the external circuit 16 through the port 15a is authorized.

FIG. 4A–FIG. 4J are timing charts showing operations of the respective parts of the I/O port 13a according to the embodiment 1 in relation to the port 15a which is in a normal state.

With reference to FIGS. 1 to 4J, the operation of the I/O port 13a according to the embodiment 1 is described in relation to the port 15a which is in a normal state.

"0" is inputted in a data terminal of the port latch 40 as the data S20 in a period T31 as shown in FIG. 4A, this data S20 is held by the port latch 40 in accordance with the control signal S21.

When the output buffer control signal S23 is zeroed to authorize the output buffer 23a to output, the data S22 held by the port latch 40 is outputted to the external circuit 16 from the output buffer 23a through the port 15a. In the following description of the embodiment 1, it is assumed that the output buffer 23a is an output enabled state.

When the signal S24 of the port 15a is normal, the data S22 held by the port latch 40 shown in FIG. 4A and the logical level of the port 15a are identical to each other.

When the data S22 held by the port latch 40 changes from "0" to "1", for example, in a period T32, the signal S24 enters a level corresponding to "1" from "0" in a period T32, as shown in FIG. 4B. At this time, the voltage (the level of the signal S24 of the port 15a causes rounding in a signal rise waveform in the period T32 by a parasitic capacitance or the like.

The signal S24 is detected by the invertor 49 having the low threshold value of 0.2 Vcc, for example, in the period T32, and "1" is outputted as the output signal S53 of the invertor 51, as shown in FIG. 4D. This signal S53 and the data S22 held by the port latch 40 are inputted in the EX-NOR gate 53 and compared with each other, so that "1" is outputted as the signal S55 in the period T32, as shown in FIG. 4F.

When the voltage of the port 15a is further increased to the Vcc level, the invertor 48 having the high threshold value reacts and "1" is outputted as the output signal S52 of the invertor 50. The EX-NOR gate 52 compares the input signal S52 of the invertor 50 with the data S22 held by the port latch 40, and "0" is outputted as the output signal S54 in the period T32, as shown in FIG. 4E.

Similarly, when the data S22 held by the port latch 40 changes from "1" to "0" in a period T35 as shown in FIG. 4A, the signal S24 of the port 15a also enters a voltage level corresponding to "0" from "1". The signal S24 of the port 15a is detected by the invertor 48 having the high threshold value of 0.8 Vcc, for example, and "0" is outputted as the signal S52. This signal S52 and the data S22 held by the port latch 40 are inputted in and compared with each other by the EX-NOR gate 52, and "1" is outputted as the output signal S54 in the period T35, as shown in FIG. 4E.

When the voltage of the port 15a is reduced to a lower level, the invertor 49 having the lower threshold value reacts and "0" is outputted as the signal S53 in a period T36, as shown in FIG. 4D. The EX-NOR gate 53 compares the output signal S53 of the invertor 51 with the data S22 held by the port latch 40, and "1" is outputted as the output signal S55, as shown in FIG. 4F.

Then, the accident determination signal generating circuit 83 generates the single accident determination signal 56 for notifying the CPU 11a of presence/absence of accident detection on the basis of the output signals S54 and S55 which are the plurality of output signals of the comparison circuit 82 in correspondence to the plurality of threshold values.

The output signals S54 and S55 of the comparison circuit 82 are inputted in the AND gate 54, so that a signal S60 shown in FIG. 4G is obtained. The output signal S60 is delayed by the invertors 55 and 56 to output a signal S60a shown in FIG. 4H, and the signals S60 and S60a are inputted in the OR gate 58 so that pulses having shorter pulse widths than a prescribed one are eliminated to generate the accident determination signal S56 as shown in FIG. 4I.

As shown in FIG. 4G, FIG. 4H and FIG. 4I, it is understood that the accident determination signal S56 becomes "1" when the signal S24 is normal.

FIG. 5A–FIG. 5K are timing charts showing operations of the respective parts of the I/O port 13a according to the embodiment 1, in relation to the port 15a causing an accident. FIG. 5B is in exaggerated non-proportional scale.

When the data S22 held by the port latch 40 is at the level "0" and the external circuit 16 short-circuits with the power supply line in a period T41 as shown in FIG. 5A, the voltage (the level of the signal S24) of the port 15a is increased toward Vcc in a period T42, as shown in FIG. 5B. However, the voltage of the port 15a is decided by short-circuit resistances having various resistance values depending on the short-circuit modes, and hence the port 15a reaches various voltage states shown by curves L1a to L3a, for example.

According to this embodiment, the invertor 49 having a low threshold value N3 of 0.2 Vcc, for example, and the invertor 48 having a high threshold value N6 of 0.8 Vcc, for example, are connected in parallel with the port 15a as port logical level detectors, for detecting the logical level of the port 15a.

When the port 15a causes such an accident that its voltage reaches a low level of about 0.4 Vcc along the curve L3a, for example, the invertor 49 having the low threshold value N3 of 0.2 Vcc and the invertor 51 serially connected thereto measure the voltage (the level of the signal S24) of the port 15a in a period T42 as shown in FIG. 5B, and "1" is outputted as the signal S53, as shown in FIG. 5D.

On the other hand, the first logical level detector formed by the invertor 48 having the threshold value N2 of 0.8 Vcc and the invertor 50 having the threshold value of 0.5 Vcc detects no voltage change of the port 15a in the period T42 as shown in FIG. 5C, and hence the output signal S52 of this first logical level detector remains at "0".

Then, the data S22 held by the port latch 40 and the signal S53 are inputted in the EX-NOR gate 53 of the comparison circuit 82 in the period T42 as shown in FIG. 5F, and "0" is obtained as its signal output.

On the other hand, the data S22 held by the port latch 40 and the signal S52 are inputted in the EX-NOR gate 52 in the period T42 as shown in FIG. 5E, and "1" is outputted as the output signal S54.

Then, the output signals S54 and S55 of the comparison circuit 82 are inputted in the accident determination signal generating circuit 83, whereby the accident determination signal S56 can be formed similarly to the case where the port 15a is at a normal voltage level. When the external circuit 16 short-circuits with the power supply line, "0" is obtained as the accident determination signal S56, as shown in FIG. 5I.

When the data S22 held by the port latch 40 is at the level "1" and the external circuit 16 short-circuits with the earthing wire in a period T51 as shown in FIG. 5A, on the other hand, the voltage of the port 15a is reduced toward 0 V, as shown in FIG. 5B. Also in this case, the voltage of the port 15a is decided by short-circuit resistances having various resistance values depending on the short-circuit modes, and hence the port 15a reaches various voltage states shown by curves L4a to L6a, for example.

According to this embodiment, the invertor 49 having the low threshold value of 0.2 Vcc, for example, and the invertor 48 having the high threshold value of 0.8 Vcc, for example, are connected in parallel with the port 15a as port logical level detectors for detecting the logical level of the port 15a, whereby the invertor 48 having the high threshold value N6 of 0.8 Vcc, for example, detects the port logical level in the period T52 when the voltage of the signal S24 remains at a high level of about 0.6 Vcc along the curve L6a shown in FIG. 5B due to occurrence of an accident, and "0" is obtained as the output signal S52 as shown in FIG. 5D.

On the other hand, the invertor 49 having the threshold value of 0.2 Vcc detects no voltage change of the port 15a in the period T52 as shown in FIG. 5C, whereby the signal S53 remains at "1".

Then, the data S22 held by the port latch 40 and the signal S53 are inputted in the EX-NOR gate 53 of the comparison circuit 82 in the period T52 as shown in FIG. 5F, and the EX-NOR gate 53 outputs "1" as the output signal S55.

On the other hand, the data S22 held by the port latch 40 and the port logical level S52 are inputted in the EX-NOR gate 52 in the period T52 as shown in FIG. 5E, and the EX-NOR gate 52 outputs "0" as the output signal S54.

Then, the output signals S54 and S55 of the comparison circuit 82 are inputted in the accident determination signal generating circuit 83, whereby the accident determination signal S56 can be generated similarly to the case where the port voltage is normal. When the external circuit 16 short-circuits with the earthingg wire, "0" is obtained as the accident determination signal S56, as shown in FIG. 5I.

Thus, "0" is outputted as the accident determination signal S56 whether the port 15a is shifted to "1" while the port latch 40 outputs "0" or the port 15a is shifted to "0" while the port latch 40 outputs "1". Thus, it is understood that an accident takes place in the port 15a when the accident determination signal S56 is "0".

In the I/O port 13a according to the embodiment 1, the logical level of the port 15a is detected by the port logical level detection circuit 81 having a plurality of threshold values, whereby it is possible to determine whether the voltage of the port 15a is correctly at the logical level "1", at the logical level "0", or at an intermediate level. Therefore, it is possible to also detect a half-destructive accident bringing the voltage of the port 15a into an intermediate level in an indefinite region slightly displaced from a prescribed logical level, for protecting the output buffer 23a against destruction also in such an accident.

While two parallel invertors having different threshold values are employed in the embodiment 1, it is possible to further finely determine an accident with a different voltage level by further increasing the number of invertors.

While the invertors having prescribed threshold values are employed for the port logical level detection circuit in the embodiment 1, elements such as Zener diodes or comparators having prescribed threshold values capable of determining whether or not the voltage of the port 15a is in a prescribed voltage region may alternatively be employed.

While the accident detected through abnormality of the port voltage is described as that mainly resulting from a short-circuit accident in the external circuit 16, the accident includes that resulting from destruction or deterioration of the output buffer 23a itself, as a matter of course.

When "0" is detected as the accident determination signal S56, the accident notice circuit 84 generates the interrupt signal S57a or S57b to the CPU 11a, so that the CPU 11a is notified of occurrence of the accident through the interrupt control circuit 12a and executes a countermeasure for the accident.

Embodiment 2

Figure 6:
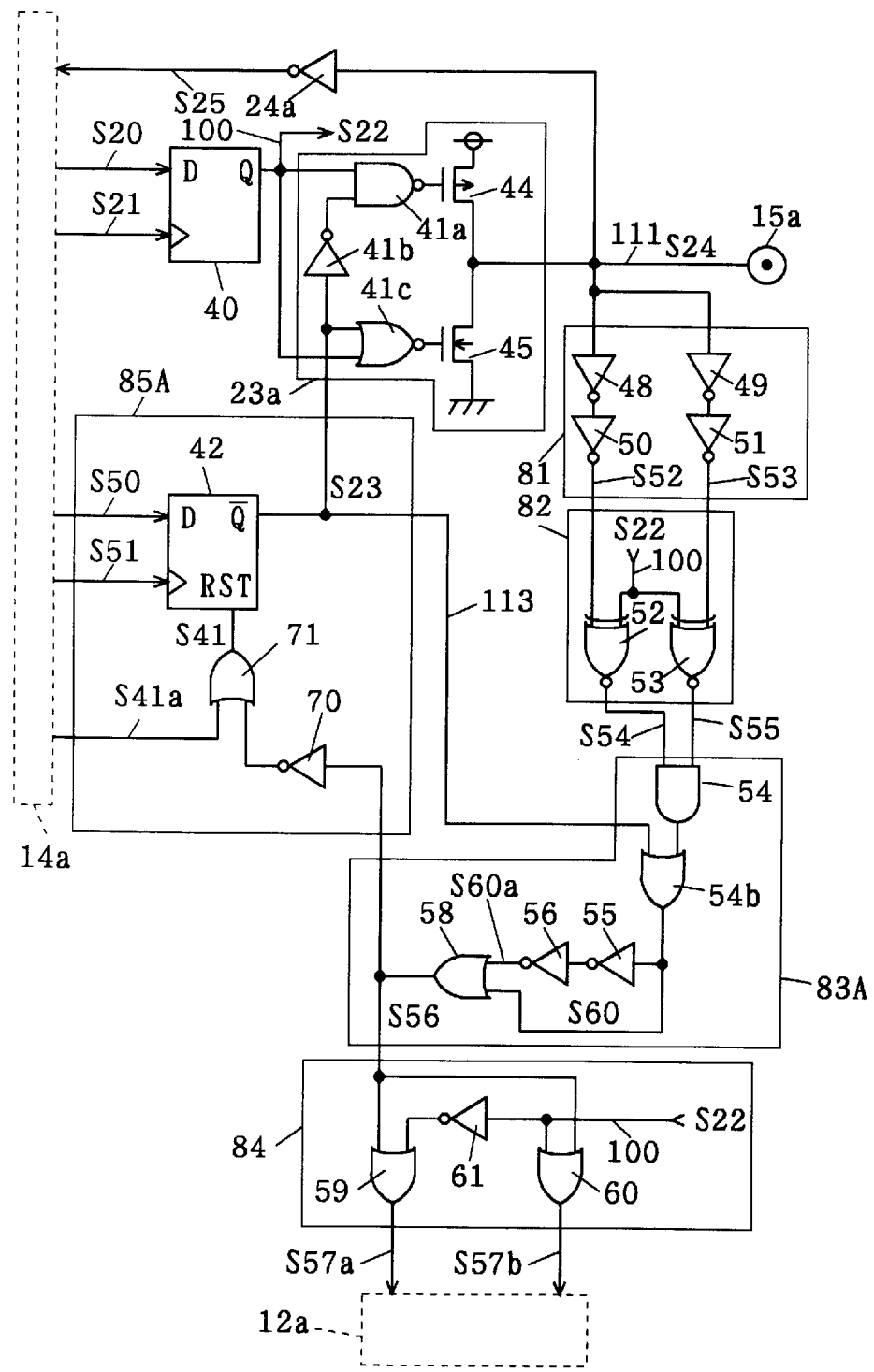
FIG. 6 is a circuit diagram showing the structure of an I/O port according to an embodiment 2 of the present invention.

FIG. 6 is a circuit diagram showing the structure of an I/O port according to an embodiment 2 of the present invention. Referring to FIG. 6, numeral 85A denotes an output buffer control circuit, which is adapted to control output authorization/unauthorization for an output buffer 23a. The output buffer control circuit 85A is formed by a direction register 42 holding data for setting output authorization/unauthorization for the output buffer 23a and deciding an input/output direction of the I/O port, and a circuit including an invertor 70 and an OR gate 71 for inhibiting the output buffer 23a from outputting through the direction register 42 on the basis of an accident determination signal S56 determining an accident through the direction register 42.

An OR gate 54b computes and outputs the OR of an output of the AND gate 54 and a signal S23. Namely, the output of the AND gate 54 is supplied to the OR gate 58 and an input terminal of an invertor 55 through the OR gate 54b. The OR gate 54b is adapted to inhibit a protective circuit from operating when a port 15a is in an input state. Thus, an accident determination signal generating circuit 83A is structured by adding the OR gate 54b to the accident determination signal generating circuit 83 of the embodiment 1. The remaining parts having the same reference numerals as those in FIG. 2 correspond to these parts.

FIG. 7A–FIG. 7E are timing charts showing the operation of the I/O port shown in FIG. 6.

Figure 7:
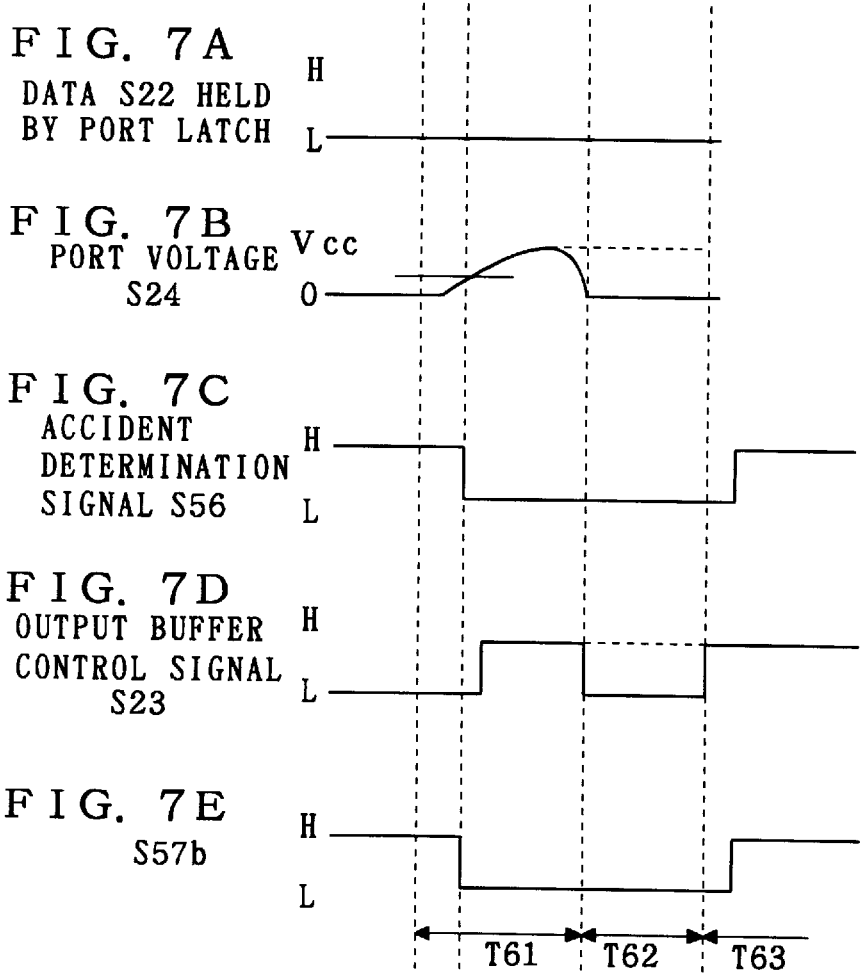
FIG. 7A–FIG. 7E are timing charts showing the operation of the I/O port shown in FIG. 6.

It is assumed that data S22 held by a port latch 40 is "0" in an initial stage, as shown in FIG. 7A. When abnormality results in a voltage (the level of a signal S24) of the port 15a in a period T61 as shown in FIG. 7B, the accident determination signal S56 becomes "0" as shown in FIG. 7C, similarly to the embodiment 1. When this is inputted in a reset terminal of the direction register 42, the output buffer control signal S23 becomes "1" as shown in FIG. 7D, and the output buffer 23a enters an output inhibited state.

The output buffer 23a entering the output inhibited state is brought into a high impedance state as viewed from the port 15a. Thus, no high current flows in/out from the output buffer 23a even if a short-circuit accident takes place in an external circuit 16, whereby the output buffer 23a is not destroyed.

When the accident determination signal S56 becomes "0", an accident notice circuit 84 forms an interrupt signal S57b to a CPU 11a as shown in FIG. 7E, for notifying the CPU 11a of the occurrence of the accident.

If the accident of the port 15a temporarily results from an external noise or the like, the voltage (the level of the signal S24) of the port 15a immediately returns to a normal value in general. Therefore, data S50 and S51 of a data terminal and a control terminal of the direction register 42 are operated by a method similar to that for initializing the output buffer 23a shown in FIG. 2 in relation to the embodiment 1, for setting the output buffer control signal S23 at "0", as shown in FIG. 7D.

If the voltage of the port 15a returns to a normal level, the output buffer control signal S23 maintains this state and enables the output. If the accident is not restored as shown by a dotted line in FIG. 7B, on the other hand, the output buffer control signal S23 immediately becomes "1" as shown by a dotted line in FIG. 7D, and inhibits the output.

In a period T63 when the voltage of the port 15a is at a normal level, the data S50 and S51 of the data terminal and the control terminal of the direction register 42 are operated to set the output buffer control signal S23 at "1" as shown in FIG. 7D for inhibiting the output buffer 23a from outputting while bringing the port 15a into an input state. At this time, the OR gate 54b regularly sets the accident determination signal S56 at "1".

According to the circuit shown in FIG. 6, the output buffer 23a is brought into an output inhibited state simultaneously with occurrence of an accident, whereby the output buffer 23a can be prevented from destruction before completion of accident processing by interruption to the CPU 11a.

On the other hand, the output buffer 23a can be released from the output inhibited state if the accident of the port 15a is temporary, whereby it is possible to efficiently return to the job without losing a processing result up to an intermediate stage.

Embodiment 3

Figure 8:
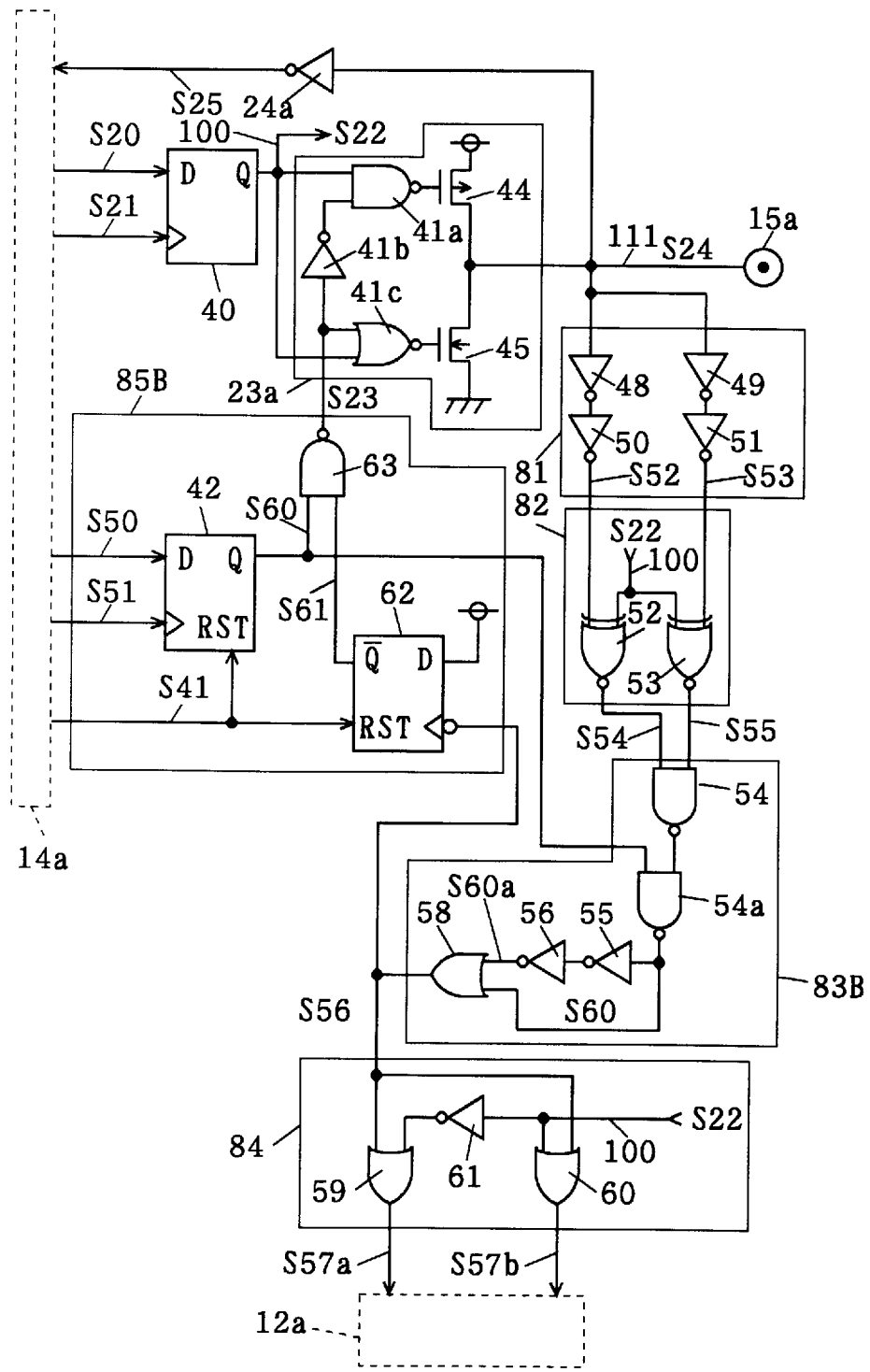
FIG. 8 is a circuit diagram showing the structure of an I/O port according to an embodiment 3 of the present invention.
Figure 11:
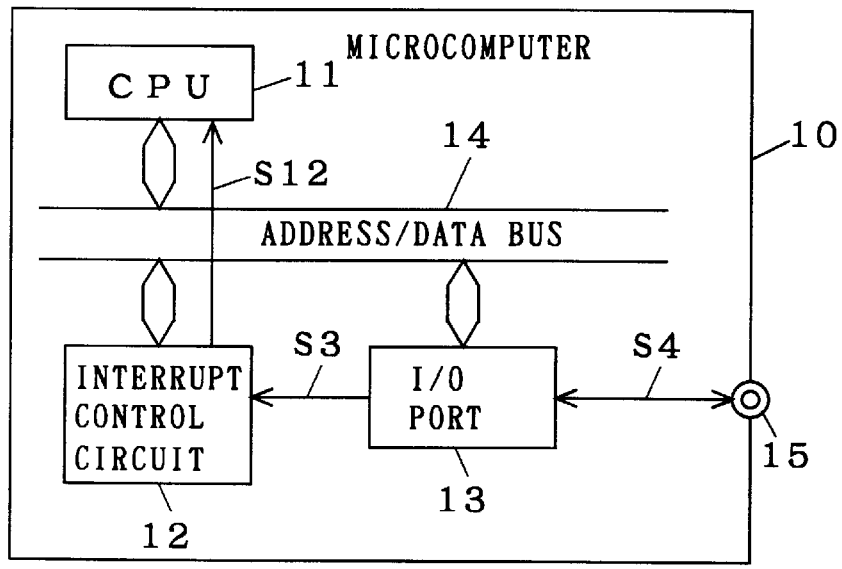
FIG. 11 is a block diagram showing the structure of a conventional microcomputer.
Figure 12:
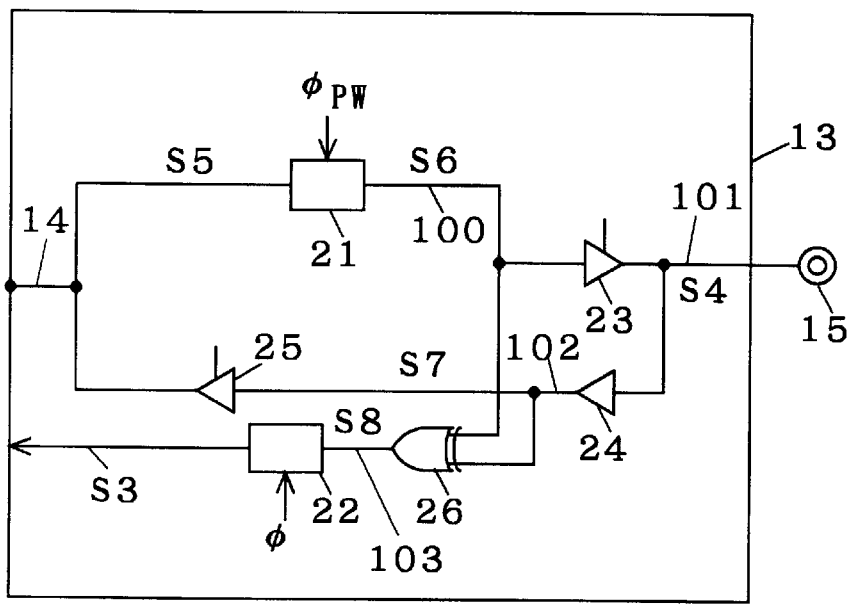
FIG. 12 is a block diagram showing the structure of a conventional I/O port.
Figure 13:
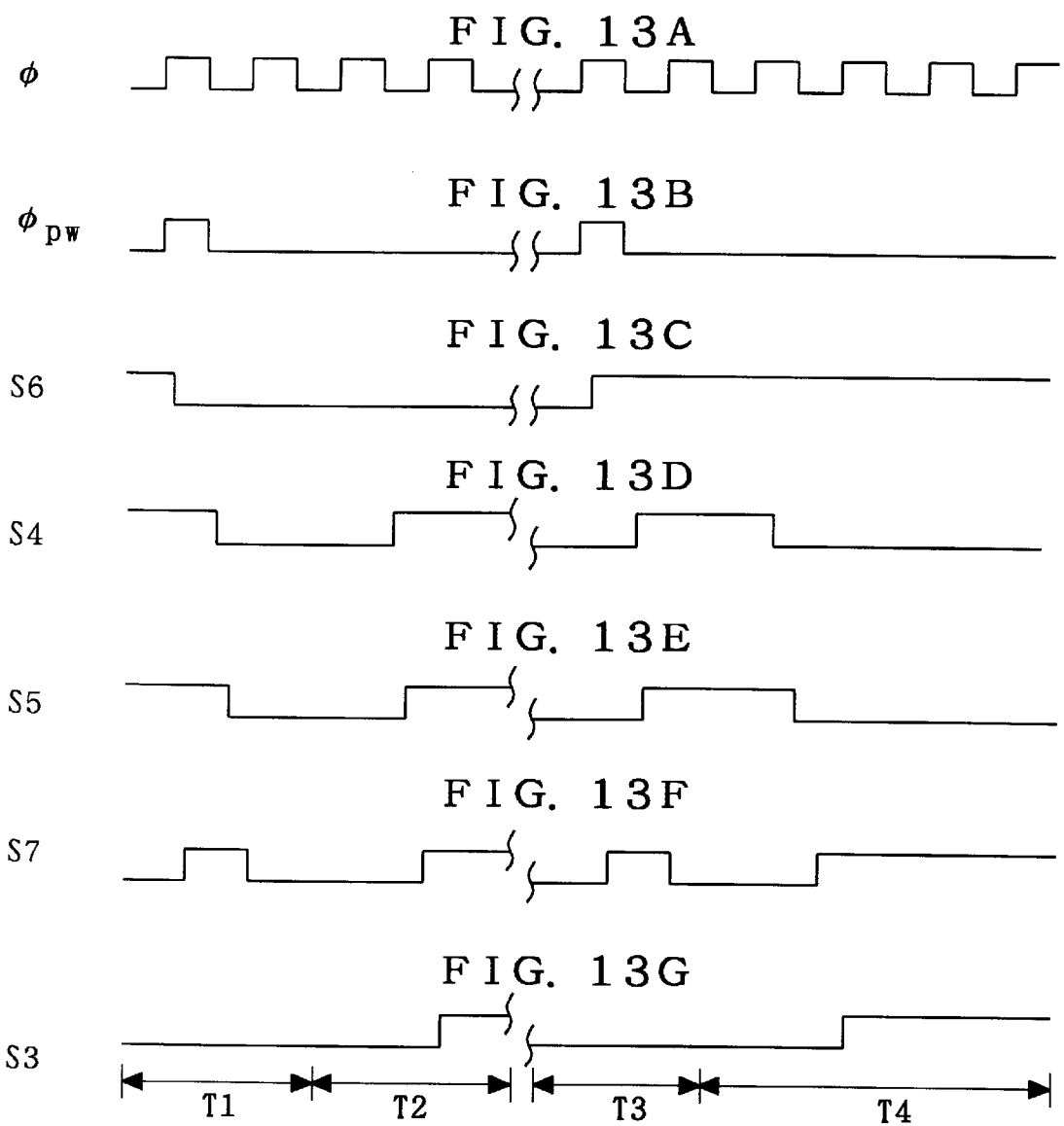
FIG. 13A–FIG. 13G are timing charts showing the operation of the conventional I/O port.
Figure 14:
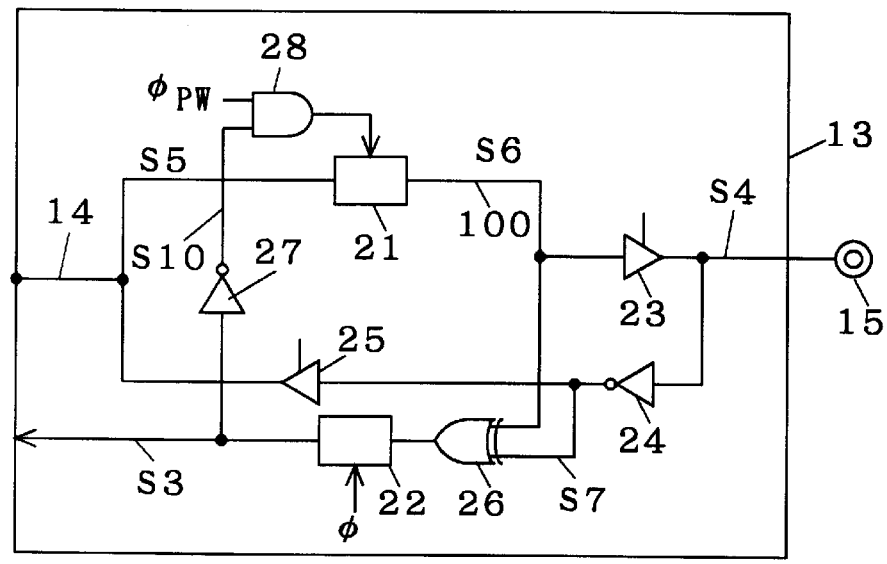
FIG. 14 is a block diagram showing another structure of a conventional I/O port.
Figure 15:
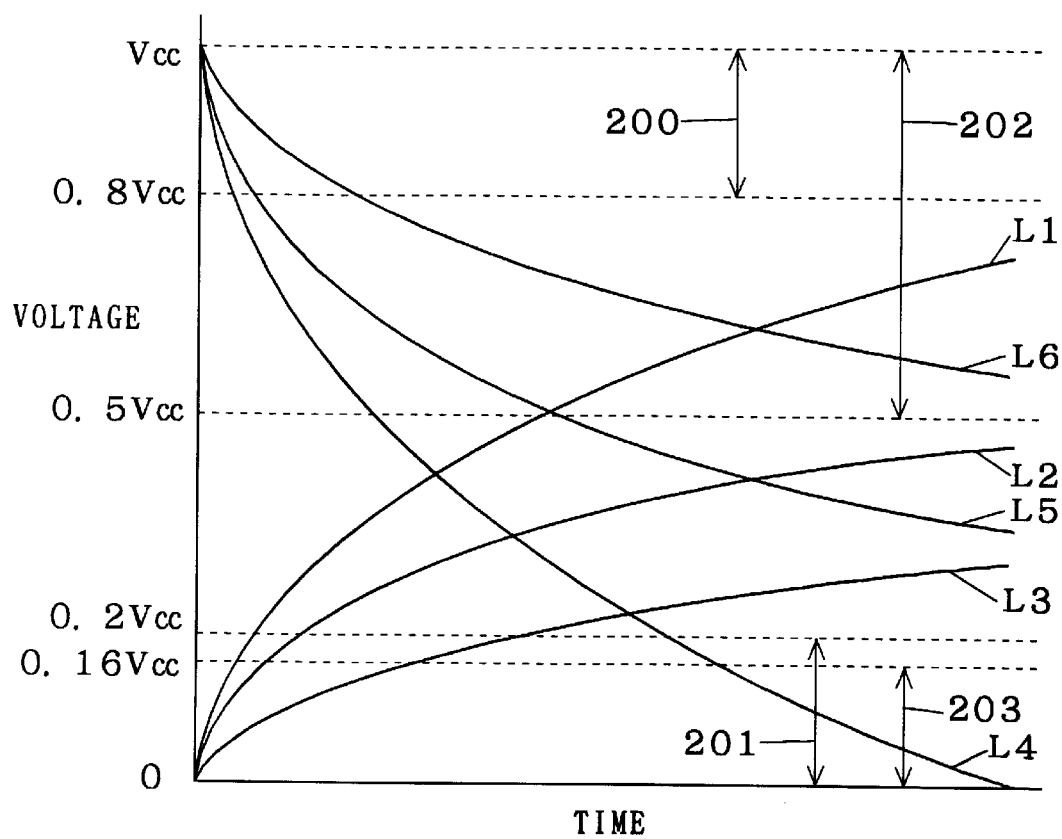
FIG. 15 is a graph showing the voltage of the port in occurrence of an accident.

FIG. 8 is a circuit diagram showing the structure of an I/O port according to an embodiment 3 of the present invention. Referring to FIG. 8, character 85B denotes an output buffer control circuit, which is adapted to control output authorization/unauthorization for an output buffer 23a. The output buffer control circuit 85B is formed by a direction register 42 holding set data of output authorization/unauthorization for the output buffer 23a, a D flip-flop which is an output inhibit register 62 for holding the set data for setting output authorization/unauthorization for the output buffer 23a on the basis of an accident determination signal S56, and a NAND gate 63 for preferring output inhibition of the output buffer 23a based on the accident determination signal S56.

On the other hand, an accident determination signal generating circuit 83B is formed by adding a NAND gate 54a having a first input terminal which is connected to an output terminal of an AND gate 54 and a second input terminal for receiving a signal S60 to the accident determination signal generating circuit 83 of the embodiment 1. The NAND gate 54a is adapted to change an output of the AND gate 54 to inhibit a protective circuit from operating when the output buffer 23a is in an output inhibited state and the I/O port is in an input state. The remaining parts having the same reference numerals as those in FIG. 2 correspond to these parts.

FIG. 9A–FIG. 9F are timing charts showing operations of the respective parts of the I/O port according to the embodiment 3 for setting initial output authorization/unauthorization for the output buffer 23a. The operation of the circuit according to the embodiment 3 is described with reference to FIGS. 8 and 9.

As an initializing step for setting the output buffer 23a in an output enabled state, "1" is inputted in the direction register 42 and a reset terminal of the output inhibit register 62 in a period T71, as a reset signal S41 shown in FIG. 9A. The reset signal S41 is prepared from a reset signal for initializing the overall microcomputer chip.

An output signal S61 of the output inhibit register 62 becomes "1" as shown in FIG. 9B, and an output signal S60 of the direction register 42 becomes "0" as shown in FIG. 9C. At this time, an output buffer control signal S23 outputted from the NAND gate 63 becomes "1" as shown in FIG. 9F, and the output buffer 23a is in an output inhibited state.

Then, "1" is inputted in a data terminal of the direction register 42 as input data S50 as shown in FIG. 9D and "0" is inputted in a control terminal as a control signal S51 as shown in FIG. 9E in a period T72, whereby the output signal S60 of the direction register 42 which has been "0" becomes "1" when the control signal S51 is converted to "1" in a period T73 as shown in FIG. 9C, the output buffer control signal S23 outputted from the NAND gate 63 becomes "0" as shown in FIG. 9F, and the output buffer 23a can be set in an output enabled state.

When "0" is inputted in the data terminal of the direction register 42 as the input data S50 and "1" is inputted in the control terminal as a control signal S51 as shown in FIG. 9E in a period T74, the output signal S60 of the direction register 42 becomes "0" as shown in FIG. 9C, the output buffer control signal S23 becomes "1" as shown in FIG. 9F, and the output buffer 23a enters an output inhibited state. Thus, a port 15a can be set in an input enabled state.

With reference to a timing chart shown in FIG. 10A–FIG. 10F, an operation upon occurrence of an accident such as short-circuiting in an external circuit is now described. FIG. 10A–FIG. 10F show signals S56, S61, S60, S23, S5() and S51, respectively.

In a period T81 of a normal state, the accident determination signal S56 is "1" as shown in FIG. 10A, and the output signal S60 of the direction register 42 is "1" as shown in FIG. 10C.

On the other hand, the accident determination signal S56 is immediately inputted in the output inhibit register 62 which is an output inhibit circuit simultaneously with determination of an accident. When an accident takes place in the external circuit in a period T82 as shown in FIG. 10D, the accident determination signal S56 changes to "0", and the output signal S61 of the output inhibit register 62 becomes "0" on the trailing edge of the accident determination signal S56. Thus, the output buffer control signal S23 becomes "1", whereby the output buffer 23a can be brought into an output inhibited state.

When the accident takes place in the external circuit in the period T82, the accident determination signal S56 is inputted in an accident notice circuit 84, so that a power supply line short-circuit signal S57b or an earthing wire short-circuit signal S57a which is an interrupt signal to a CPU 11a is generated on the basis of the accident determination signal S56 and data S22 held by a port latch 40), for notifying the CPU 11a of occurrence of abnormality in the voltage (a voltage level of a signal S24) of the port 15a and requiring an accident countermeasure.

According to the embodiment 3, however, the output buffer 23a is immediately inhibited from outputting simultaneously with the occurrence of the accident, whereby no high current flows in/out from the external circuit.

Therefore, it is possible to protect the output buffer 23a against destruction until the CPU 11a performs accident processing due to the notification of the accident.

When the accident determination signal S56 is set at "0", the output signal S61 of the output inhibit register 62 is maintained at "0" until the same is reset by the reset signal S41 and hence the output buffer control signal S23 remains "1". Thus, the output buffer 23a cannot be released from the output inhibited state.

Therefore, even if the microcomputer runs away due to an accident of the external circuit or the like and the data S50 and S51 of the direction register 42 are operated, the output buffer 23a can be protected since set data of output inhibition is not rewritten.

While the invention has been shown and described in detail, the foregoing description is in all aspects illustrative and not restrictive. It is therefore understood that numerous modifications and variations can be devised without departing from the scope of the invention.

I claim:

1. A microcomputer having a central processing unit, an I/O port for inputting/outputting data in/from an external circuit being present in the exterior of said microcomputer, and an interrupt control circuit for generating interrupt control on said central processing unit on the basis of an accident notice signal being formed in said I/O port, said I/O port including:

a connecting terminal with said external circuit;

a port logical level detection circuit for comparing a plurality of threshold values between voltage levels providing logical levels of said external circuit with a voltage level of said connecting terminal for outputting logical levels being decided by said plurality of threshold values as detection results;

a port latch for holding data to be outputted to said connecting terminal;

an output buffer for outputting said data being held by said port latch to said connecting terminal;

a comparison circuit for comparing said data being held by said port latch with a plurality of said detection results of said port logical level detection circuit thereby outputting a plurality of comparison results; and an accident determination signal generating circuit for generating an accident determination signal for reporting presence/absence of an accident on the basis of said plurality of comparison results of said comparison circuit corresponding to said plurality of threshold values, said I/O port outputting said accident notice signal for generating interrupt control on said central processing unit on the basis of said accident determination signal upon occurrence of an accident mismatching said voltage level of said connecting terminal with said data being held by said port latch.

2. The microcomputer in accordance with claim 1, wherein said plurality of threshold values being voltage levels between said logical levels of said external circuit are lower and upper limit values of voltages providing logical levels "0" and "1" respectively.

3. The microcomputer in accordance with claim 1, further including an output buffer control circuit for inhibiting said output buffer from outputting on the basis of said accident determination signal.

4. The microcomputer in accordance with claim 3, wherein said output buffer control circuit includes an output inhibit register for holding set data of output authorization/unauthorization for said output buffer being based on said accident determination signal.

5. The microcomputer in accordance with claim 1, wherein said port logical level detection circuit includes:

a first invertor being connected with said connecting terminal so that its output is inverted about a first threshold value among said plurality of threshold values;

a second invertor being connected with said connecting terminal so that its output is inverted about a second threshold value among said plurality of threshold values;

a third invertor for inverting said output of said first invertor and outputting the same as a first detection result among said plurality of detection results; and a fourth invertor for inverting said output of said second invertor and outputting the same as a second detection result among said plurality of detection results.

6. The microcomputer in accordance with claim 1, further including an accident notice circuit for adding information of said data being held by said port latch to information of said accident determination signal being outputted from said accident determination signal generating circuit while generating said accident notice signal for notifying said interrupt control circuit of occurrence of said accident.

* * * * *